United States Patent
Kawata et al.

(10) Patent No.: US 11,810,324 B2
(45) Date of Patent: Nov. 7, 2023

(54) IMAGE DATA OBTAINING METHOD

(71) Applicant: SERENDIP RESEARCH, Osaka (JP)

(72) Inventors: Satoshi Kawata, Osaka (JP); Shogo Kawano, Osaka (JP)

(73) Assignee: SERENDIP RESEARCH, Osaka (JP)

(*) Notice: Subject to any disclaimer, the term of this patent is extended or adjusted under 35 U.S.C. 154(b) by 315 days.

(21) Appl. No.: 17/422,918

(22) PCT Filed: Jan. 31, 2020

(86) PCT No.: PCT/JP2020/003652
§ 371 (c)(1),
(2) Date: Jul. 14, 2021

(87) PCT Pub. No.: WO2020/195154
PCT Pub. Date: Oct. 1, 2020

(65) Prior Publication Data
US 2022/0130071 A1 Apr. 28, 2022

(30) Foreign Application Priority Data

Mar. 28, 2019 (JP) .................................. 2019-064034
Nov. 12, 2019 (JP) .................................. 2019-204761

(51) Int. Cl.
*G06T 7/73* (2017.01)
*G06T 7/62* (2017.01)
(Continued)

(52) U.S. Cl.
CPC ............... *G06T 7/75* (2017.01); *G01N 21/65* (2013.01); *G02B 21/006* (2013.01);
(Continued)

(58) Field of Classification Search
CPC .... G06T 7/75; G06T 7/62; G06T 7/66; G01N 21/65; G02B 21/0036; G02B 21/006; G02B 21/002; G02B 21/365; G02B 21/0024
See application file for complete search history.

(56) References Cited

U.S. PATENT DOCUMENTS

| 6,128,077 A | 10/2000 | Jovin et al. |
| 2011/0296562 A1 | 12/2011 | Beaurepaire et al. |
| 2016/0223457 A1 | 8/2016 | Krishnamachari |

FOREIGN PATENT DOCUMENTS

| JP | 11-249023 | 9/1999 |
| JP | 2014-224856 | 12/2014 |

(Continued)

OTHER PUBLICATIONS

Extended European Search Report dated Dec. 9, 2022 in corresponding European Patent Application No. 20778641.9.

(Continued)

*Primary Examiner* — Edward F Urban
*Assistant Examiner* — Wassim Mahrouka
(74) *Attorney, Agent, or Firm* — Wenderoth, Lind & Ponack, L.L.P.

(57) ABSTRACT

A method for obtaining image data of a subject, including; a first scanning step including a plurality of steps W, each step W being a step of determining one place existing in a one-dimensional, two-dimensional, or three-dimensional first space; and a second scanning step of scanning insides of second spaces including at least one of the places, wherein the second scanning step includes a step X of randomly determining a location of an observation point and a step Y of obtaining a piece of image data for the observation point, and, at a time point of end of scanning an inside of one of the second spaces, the second space has a first region including 50% of observation points and a second region existing outside the first region and including remaining 50% of the observation points, the second region being larger than the first region by at least 15%.

20 Claims, 8 Drawing Sheets

(51) Int. Cl.
  *G06T 7/66* (2017.01)
  *G01N 21/65* (2006.01)
  *G02B 21/00* (2006.01)
(52) U.S. Cl.
  CPC ............ *G02B 21/0036* (2013.01); *G06T 7/62* (2017.01); *G06T 7/66* (2017.01)

(56) References Cited

FOREIGN PATENT DOCUMENTS

| | | |
|---|---|---|
| JP | 2016-534354 | 11/2016 |
| JP | 2018-146410 | 9/2018 |

OTHER PUBLICATIONS

Godaliyadda et al., "A Model-Based Framework for Fast Dynamic Image Sampling", 2014 IEEE International Conference on Acoustics, Speech and Signal Processing (ICASSO), IEEE, May 4, 2014, pp. 1822-1826.
Rahimi et al., "Flash Scanning: An Ultra Fast Local Scanning of Complicated Objects for PSD Microscopy using 2D Bisection", 2017 IEEE International Conference on Real-Time Computing and Robotics (RCAR), IEEE, Jul. 2017, pp. 721-726.
International Search Report dated Mar. 10, 2020 in International (PCT) Application No. PCT/JP2020/003652.
Japanese Office Action dated Jul. 9, 2019 in Japanese Patent Application No. 2019-064034 with machine translation.

Example 1    Comparative Example 1

[FIG. 9]

Example 1    Comparative Example 1

[FIG. 10]

Example 1    Comparative Example 1

[FIG. 11]

Example 1    Comparative Example 1

[FIG. 12]

Example 1　　　　Comparative Example 1

[FIG. 13]

Example 1　　　　Comparative Example 1

[FIG. 14]

Example 1　　　　Comparative Example 1

[FIG. 15]

Example 1　　　　Comparative Example 1

[FIG. 16]

Example 2  Comparative Example 2

[FIG. 17]

Example 2  Comparative Example 2

[FIG. 18]

Example 2  Comparative Example 2

[FIG. 19]

Example 2  Comparative Example 2

[FIG. 20]

Example 2    Comparative Example 2

[FIG. 21]

Example 2    Comparative Example 2

[FIG. 22]

Example 2    Comparative Example 2

[FIG. 23]

Example 2    Comparative Example 2

IMAGE DATA OBTAINING METHOD

TECHNICAL FIELD

The present invention relates to: an image data obtaining method; a program configured to execute the image data obtaining method; a confocal microscope configured to execute the image data obtaining method; and a Raman microscope configured to execute the image data obtaining method.

BACKGROUND ART

Various studies have been conducted mainly from the viewpoint of: how to enable image obtaining devices such as microscopes and telescopes to have improved spatial resolutions and improved wavelength resolutions; how to enable the image obtaining devices to swiftly obtain information about an object that is being observed; and the like.

For example, Patent Literature 1 listed below describes a confocal spectroscopic video system capable of swiftly obtaining data. As described in claim 1 of this literature, the confocal spectroscopic video system includes: a light source means; a light modulation means configured to guide a predetermined lighting pattern for forming a lighting opening and causing a location of an object, which is being inspected, to be conjugate; and an analysis means including a detection opening, a spectroscopic dispersion element, and a detector camera. The lighting and detection openings are located on a conjugate optical plane. In this confocal spectroscopic video system, the light modulation means is composed of a two-dimensional array of light modulation elements, a group of the elements composing the two-dimensional array is disposed to form the lighting opening according to the lighting pattern, and the light modulation means is controllably configured such that the lighting pattern changes the conjugate location of the object over time.

As described in Patent Literature 1 (paragraph [0014]), a basic idea of the confocal spectroscopic video system lies in an operation of a confocal optical video system including a spectroscopic analysis means provided with a spatial light modulator (hereinafter, referred to as SLM) means. The SLM means includes an array of light modulation elements. One array is a mask composed of light modulation elements, and the light modulation elements are individually controllable. The controllability of the light modulation elements is related to optical features of the elements such as transmission, reflection, or diffraction. A lighting pattern encoded as a lighting and/or detection opening is formed by changing the group of, or all of, the light modulation elements. Patterns for lighting or detection matched with each other are generated by different modulators or a common modulator.

As described in Patent Literature 1 (paragraph [0015]), any lighting pattern sequence may be used as a lighting pattern sequence of the confocal spectroscopic video system. For example, it is allowed to select any of: lines having finite lengths and systematically shifted at regular intervals or random intervals according to either a pseudo-random sequence or an S-matrix Hadamard sequence; a regularly dotted grid having the shape of, for example, a triangle, a square, a rectangle, a hexagon, or the like; a random pattern or a pseudo-random pattern having a finite length and based on a so-called Walsh sequence, Sylvester's sequence, Hadamard sequence, or Golay sequence; a square or rectangular grid formed in an intersecting-line pattern; tessellation patterns that are suitable for an integer number of times of rotation on the SLM elements and that are sequentially obtained on the SLM; or a combination of the above-described pattern sequences.

CITATION LIST

Patent Literature

[PTL 1] Japanese Laid-Open Patent Publication No. H11-249023

SUMMARY OF THE INVENTION

Problems to be Solved by the Invention

However, Patent Literature 1 does not describe any specific statement that use of a specific lighting pattern sequence is effective to increase the speed of obtaining information about a subject (object that is being observed). The extent of increase in the speed is not considered to be changed by merely changing the lighting pattern sequence. An object of the present invention is to provide a method for efficiently obtaining image data of a subject in a shorter time.

Solution to the Problems

[1] An image data obtaining method according to a first aspect of the present invention having achieved the above-described object is a method for obtaining image data of a subject, the image data obtaining method including;
- a first scanning step including a plurality of steps W, each step W being a step of determining one place existing in a one-dimensional, two-dimensional, or three-dimensional first space; and
- a second scanning step of scanning insides of second spaces including at least one of the places, wherein
- the second scanning step includes a step X of randomly determining a location of an observation point (hereinafter, written as "second random determination") and a step Y of obtaining a piece of image data for the observation point, and,
- at a time point of end of scanning an inside of one of the second spaces, the second space has a first region including 50% of observation points and a second region existing outside the first region and including remaining 50% of the observation points, the second region being larger than the first region by at least 15%.

In the above-described image data obtaining method, the second random determination is executed according to a probability distribution in which an appearance probability is higher at a location closer to a center location. Accordingly, a field-of-view center area is recognized with a higher accuracy. Meanwhile, as for a field-of-view periphery area, recognition of the area is slightly rough but over a wide range, the manner of the recognition is similar to the manner of obtaining information with the naked eyes for recognition. If the second random determination is thus executed according to the probability distribution in which the appearance probability is higher at a location closer to the center location, it is considered to be possible to obtain image data that is easily recognizable to an observer from an early stage after the start of the scanning.

[2] It is preferable that the above-described image data obtaining method further includes a pre-second scanning step of scanning the insides of the second spaces before start of the second scanning step, adjusting a center of scanning in the second scanning step to a specific location that has been determined through the pre-second scanning step.

[3] It is preferable to provide the image data obtaining method according to [1] or [2], wherein if, in the second scanning step, a step of determining a location of an n-th ("n" is a natural number) observation point is defined as a step Xn and a step of obtaining an n-th piece of image data corresponding to the observation point is defined as a step Yn, a number of observation points to be obtained in the second scanning step is not fixed at a time point of execution of a step X1, and the second scanning step is ended when one piece or a plurality of pieces of image data obtained through a step Y1 to the step Yn satisfy a predetermined condition.

[4] An image data obtaining method according to a second aspect of the present invention having achieved the above-described object is a method for obtaining image data of a subject, the image data obtaining method including:
  a first scanning step including a plurality of steps W, each step W being a step of determining one place existing in a one-dimensional, two-dimensional, or three-dimensional first space; and
  a second scanning step of scanning insides of second spaces including at least one of the places, wherein
  the second scanning step includes a step X of randomly determining a location of an observation point in each second space (hereinafter, written as "second random determination") and a step Y of obtaining a piece of image data for the observation point, and,
  if, in the second scanning step, a step of determining a location of an n-th ("n" is a natural number) observation point is defined as a step Xn and a step of obtaining an n-th piece of image data corresponding to the observation point is defined as a step Yn, a number of observation points to be obtained in the second scanning step is not fixed at a time point of execution of a step X1, and the second scanning step is ended when one piece or a plurality of pieces of image data obtained through a step Y1 to the step Yn satisfy a predetermined condition.

[5] It is preferable to provide the image data obtaining method according to [3] or [4], wherein the predetermined condition is that an intensity function having the one piece or the plurality of pieces of image data as arguments takes a value not larger than a predetermined value.

[6] It is preferable to provide the image data obtaining method according to [5], wherein the intensity function at a time point of completion of obtaining an n-th piece of data through the step Yn has, as arguments, m pieces of image data which have most recently obtained during the second scan, where "m" and "n" are natural numbers (m<n).

[7] It is preferable to provide the image data obtaining method according to any one of [1] to [6], wherein no scan is executed on a region that is at and within a predetermined distance from an observation point having already been scanned in each second space.

[8] It is preferable to provide the image data obtaining method according to any one of [1] to [7], wherein a plurality of second spaces of which locations are determined through the first scanning step have been selected so as to be discrete from one another.

[9] It is preferable to provide the image data obtaining method according to any one of [1] to [8], wherein the first scanning step is a step of randomly determining the locations of the second spaces in the first space (hereinafter, written as "first random determination").

[10] It is preferable to provide the image data obtaining method according to [9], wherein the first random determination is executed according to a uniform random number.

[11] It is preferable to provide the image data obtaining method according to any one of [1] to [10], wherein the second random determination is executed according to a normal random number.

[12] It is preferable to provide the image data obtaining method according to any one of [1] to [11], wherein the second scanning step is executed between one of the steps W and another one of the steps W.

[13] The image data obtaining method according to any one of [1] to [12], wherein the second spaces are arranged along a predetermined grid in the first space.

[14] The image data obtaining method according to [13], wherein if, in the first scanning step, a step of determining a place of a second space for a k-th ("k" is a natural number) time is defined as a step Wk, remaining second spaces that are located within the predetermined grid and that are other than k second spaces having already been determined through execution of steps W1 to Wk are equal to one another in terms of a probability of being determined as a (k+1)-th second space.

[15] The image data obtaining method according to any one of [1] to [14], wherein, in the first space, obtainment of image data is ended if an accumulated number of times of execution of the steps W becomes a predetermined value.

[16] An image data obtaining method according to a third aspect of the present invention having achieved the above-described object is a method for obtaining image data of a subject, the image data obtaining method including:
  a first scanning step including a plurality of steps W, each step W being a step of determining one place existing in a one-dimensional, two-dimensional, or three-dimensional first space; and
  a second scanning step of scanning insides of second spaces including at least one of the places, wherein
  the second scanning step includes a step X of randomly determining a location of an observation point in each second space (second random determination) and a step Y of obtaining a piece of image data for the observation point,
  at a time point of end of scanning an inside of one of the second spaces, the second space has a first region including 50% of observation points and a second region existing outside the first region and including remaining 50% of the observation points, the second region being larger than the first region, and
  the image data obtaining method further includes a pre-second scanning step of scanning the insides of the second spaces before start of the second scanning step, adjusting a center of scanning in the second scanning step to a specific location that has been determined through the pre-second scanning step.

[17] An image data obtaining method according to a fourth aspect of the present invention having achieved the above-described object is a method for obtaining image data of a subject, the image data obtaining method including:
  a first scanning step including a plurality of steps W, each step W being a step of determining one place existing in a one-dimensional, two-dimensional, or three-dimensional first space; and
  a second scanning step of scanning insides of second spaces including at least one of the places, wherein
  the second scanning step includes a step X of randomly determining a location of an observation point in each second space (second random determination) and a step Y of obtaining a piece of image data for the observation point, at a time point of end of scanning an inside of one of the second spaces, the second space has a first region including 50% of observation points and a second region existing outside the first region and including remaining 50% of the observation points, the second region being larger than the first region, and the step W is a step of randomly determining a location of the one place in the first space (first random determination).

[18] An image data obtaining method according to a fifth aspect of the present invention having achieved the above-described object is a method for obtaining image data of a subject, the image data obtaining method including:

a first scanning step including a plurality of steps W, each step W being a step of determining one place existing in a one-dimensional, two-dimensional, or three-dimensional first space; and a second scanning step of scanning insides of second spaces including at least one of the places, wherein the second scanning step includes a step X of randomly determining a location of an observation point in each second space (second random determination) and a step Y of obtaining a piece of image data for the observation point, at a time point of end of scanning an inside of one of the second spaces, the second space has a first region including 50% of observation points and a second region existing outside the first region and including remaining 50% of the observation points, the second region being larger than the first region, and the second scanning step is executed between one of the steps W and another one of the steps W.

[19] It is preferable to configure a program to execute the image data obtaining method according to any one of [1] to [18].

[20] It is preferable to configure a confocal microscope to execute the image data obtaining method according to any one of [1] to [18].

[21] It is preferable to configure a Raman microscope to execute the image data obtaining method according to any one of [1] to [18].

Advantageous Effects of the Invention

The image data obtaining method of the present invention basically includes at least two steps of scanning, i.e., the first scanning step and the second scanning step. The image data obtaining method makes it possible to obtain image data that is easily recognizable to an observer from an early stage after the start of the scanning, particularly since (1) as for the execution procedure of the second random determination, the second random determination is executed according to the probability distribution in which the appearance probability is higher at a location closer to the center location than at a peripheral location, or since (2) the second scanning step is ended when a piece of image data obtained in a second scan satisfies the predetermined condition.

DESCRIPTION OF EMBODIMENTS

In present cutting-edge scientific analysis and measurement, it has been required to detect, from a large area or volume of a measurement sample, a spatial distribution of very weak emitted light or scattered light in a short measurement time. However, even with cutting-edge measurement techniques and microscopic techniques, it is very difficult to concurrently satisfy the conditions of a weak signal, a large area, and a short time. An idea of the present inventors is to execute scanning on the basis of a stochastic process of Brownian motion or the like instead of deterministically determining a scanning route for obtaining image data. The manner of this scanning may be similar to the manner in which: a person finds an unexpected location from within a map; or an animal spots a prey from over a wide area. An example of specific application of this idea is as follows. That is, a molecular distribution in a living cell can be obtained by imaging with a Raman scattering spectral microscope at a high spatial resolution in a short time. In addition, this idea can be applicable also to imaging for a defect distribution and chirality of a nanomaterial such as carbon nanotubes, a strain distribution of a state-of-the-art semiconductor device, and the like. In the present invention, a scanning route determining process includes at least two scanning stages. The stages involve determining scanning routes according to, for example, a statistical and stochastic process of uniform random number, random walk, and information entropy. The observation target to which this method is applicable is not limited to one-dimensional and two-dimensional images, and, as a matter of course, this method can be effectively executed also in imaging for a three-dimensional structure.

Hereinafter, the present invention will be more specifically described based on the following embodiments. However, the present invention is not limited to the following embodiments and, as a matter of course, can also be carried out with appropriate modifications being made within the scope of the gist described above and below, and any of these modifications are included in the technical scope of the present invention.

Embodiment 1

An image data obtaining method according to embodiment 1 of the present invention is a method for obtaining image data of a subject. The method includes: a first scanning step including a plurality of steps W, each step W being a step of determining one place existing in a one-dimensional, two-dimensional, or three-dimensional first space; and a second scanning step of scanning insides of second spaces including at least one of the places. The second scanning step includes a step X of randomly determining a location of an observation point and a step Y of obtaining a piece of image data for the observation point. At a time point of end of scanning an inside of one of the second spaces, the second space has a first region including 50% of observation points and a second region existing outside the first region and including remaining 50% of the observation points, the second region being larger than the first region by at least 15%.

In the image data obtaining method according to embodiment 1, the second random determination is executed according to a probability distribution in which an appearance probability is higher at a location closer to the center location of each second space. Accordingly, a field-of-view center area is recognized with a higher accuracy. Meanwhile, as for a field-of-view periphery area, recognition of the area is slightly rough but over a wide range, the manner of the recognition is similar to the manner of obtaining information with the naked eyes for recognition. If the second random determination is thus executed according to the probability distribution in which the appearance probability is higher at a location closer to the center location, it is considered to be possible to obtain image data that is easily recognizable to an observer from an early stage after the start of the scanning.

Figure 1:
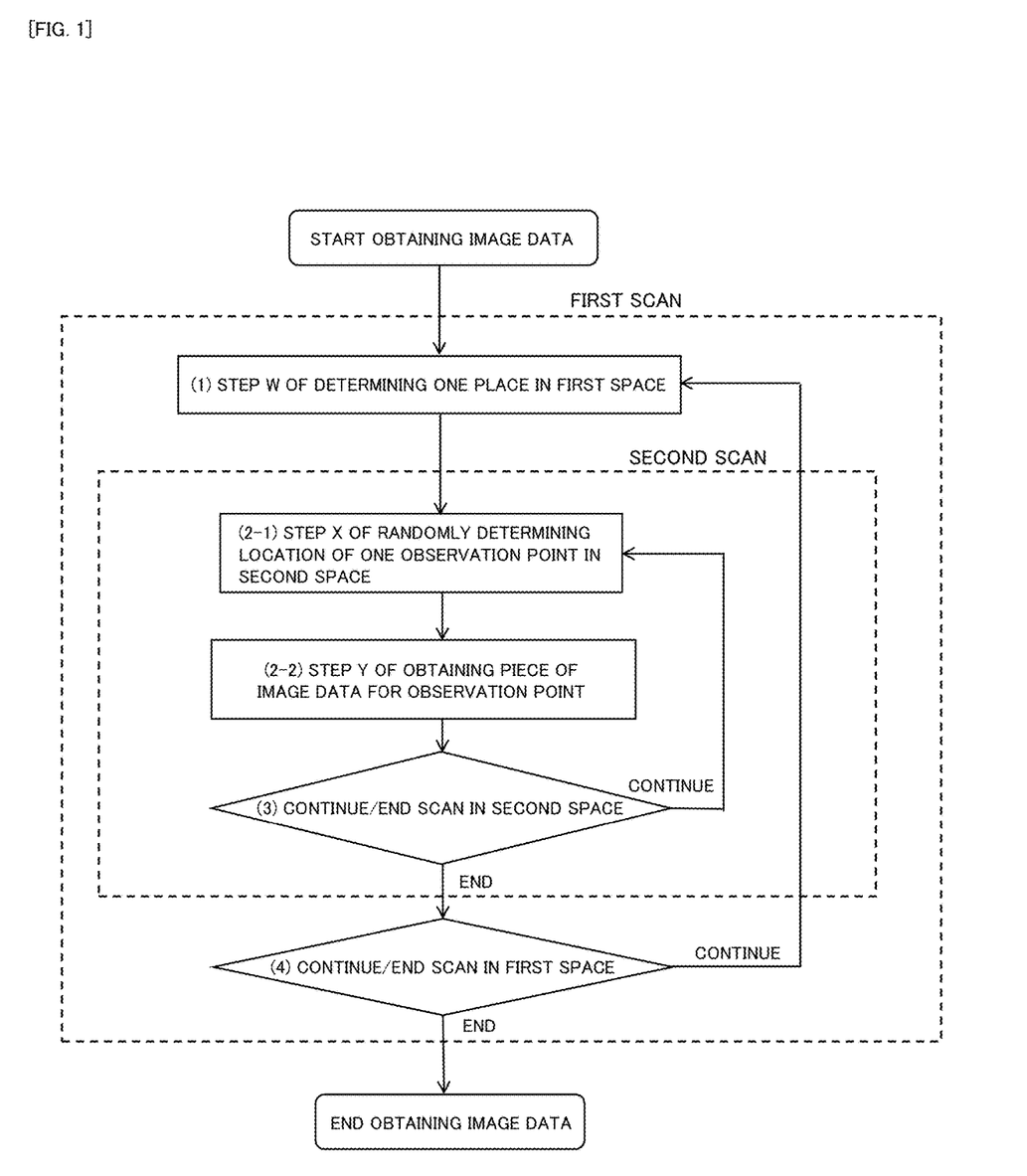
FIG. 1 is a flowchart of an image data obtaining method according to embodiment 1 or 2 of the present invention.

Hereinafter, a preferable mode of the image data obtaining method according to embodiment 1 of the present invention will be described with reference to the drawings. FIG. 1 is a flowchart of the image data obtaining method according to embodiment 1 of the present invention. The flowchart includes steps described below.

(1) First Scanning Step

A first scanning step includes a plurality of steps W. Each step W is a step of determining one place in a first space. The step W may be a step of delimiting an existence border of a second space, a step of determining a point included in the second space, or a step of determining a center location of the second space.

As for an existence border of the second space, (i) an existence border may be predetermined at a time at which the step W in the first scanning step has been executed and which precedes the start of a second scanning step described later, or (ii) no existence border of the second space may be determined before the start of the second scanning step, and, at the time of completion of the second scanning step, an existence border of the second space including an aggregate of observation points may be determined consequently.

In the first scanning step, the order or the method of determining the one place is not particularly limited, and a plurality of second spaces may be sequentially determined or concurrently determined. In order to cover a wide range of regions in the first space in a short time, the second spaces are preferably determined so as to be discrete from one another, and are more preferably determined randomly (first random determination). In the present invention, the term "random" refers to irregular selection. As necessary, irregular values may be generated by a computer or can be generated also by combining accidental values (noises or the like) obtained from a computer and a device other than the computer. In addition, a predetermined accidental value list (so-called random number table) may be prepared in advance instead of generating irregular values every time.

Figure 2:
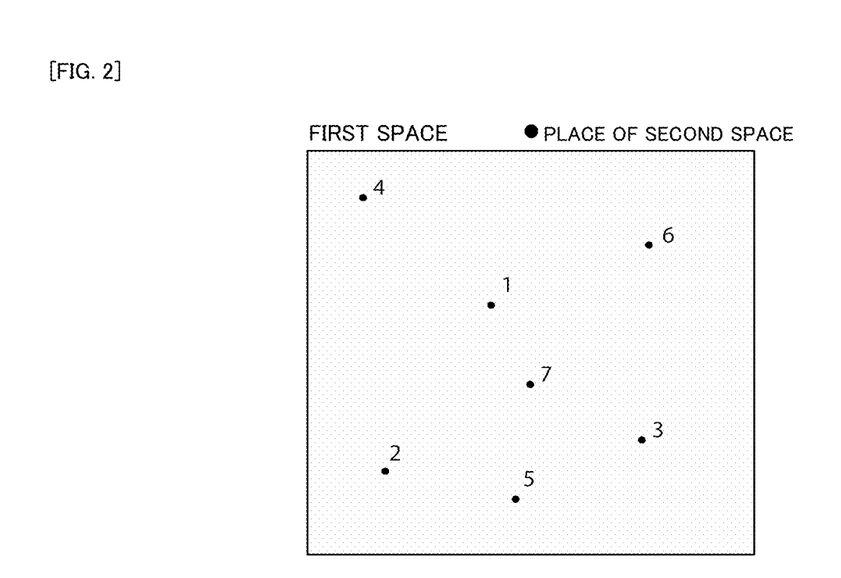
FIG. 2 shows the determined locations of second spaces according to embodiment 1 of the present invention.

FIG. 2 shows one place (typically, the center location of each second space) 1 to 7 determined in the first space through each step W. As shown in FIG. 2, the places 1 to 7 of the second spaces are positioned at irregular locations, i.e., positioned randomly. Thus, the places 1 to 7 are located to be discrete from one another over the entire first space.

Figure 3:
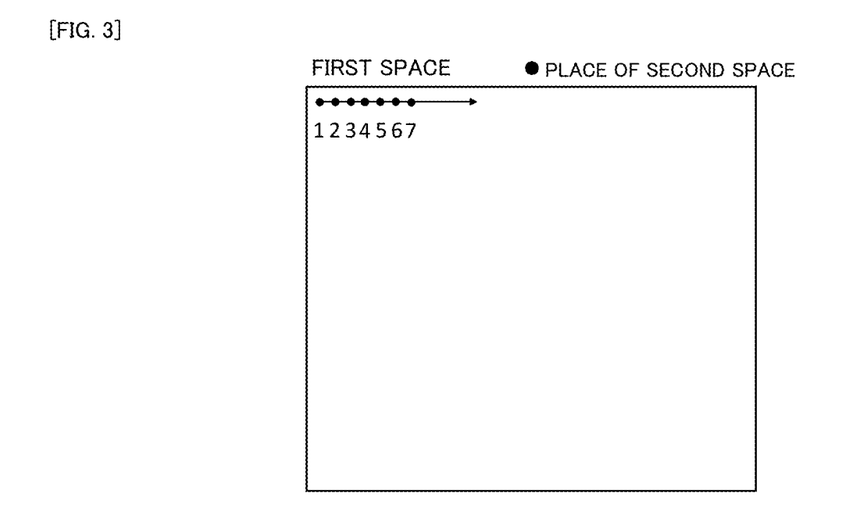
FIG. 3 shows the determined locations of second spaces according to an image data obtaining method of a reference example.

FIG. 3 shows, for reference, places 1 to 7 of second spaces that are not within the scope of embodiment 1 but are disposed through a raster scan. As shown in FIG. 3, a raster scan involves sequential scanning from a corner of the first space. Thus, the appearance of an upper portion of the screen is ascertained relatively early after the start of the scanning, whereas the appearance of a lower portion of the screen is not ascertained until the scanning is executed to the final stage.

(2) Second Scanning Step (2-1) Step X

A step X is a part of a second scanning step and is a step of randomly determining a location of at least one observation point at the one place specified through the step W (hereinafter, written as "second random determination"). Here, the second random determination is executed according to a probability distribution in which an appearance probability is higher at a location closer to the center location. Specifically, at a time point of end of scanning an inside of one of the second spaces, the second space has a first region including 50% of observation points and a second region existing outside the first region and including remaining 50% of the observation points, the second region being larger than the first region by at least 15%.

The first region can be, for example, a region having a spherical shape or a circular shape, the center of which is the center location of the second space, and having such a minimum radius as to include 50% of the observation points. The second region can be, for example, a region obtained by excluding the first region from a spherical or circular region that has a minimum radius among regions including all the observation points in the second space. In a case where the step X is executed pixel by pixel with the pixels being disposed within a three-dimensional space or a two-dimensional plane, the boundary of the above-described spherical or circular region is ordinarily not smooth, as a matter of course. Each of the above-described radii can be set to be a distance between the center location of the second space and the center location of a corresponding cell. The pixels may be arranged in a grid pattern within the three-dimensional space or the two-dimensional plane or may be arranged to be point-symmetric about the center of the second space.

In a case where the number of observation points is an odd number, the number of observation points in the first region can be larger by one than the number of observation points in the second region.

An aggregate of observation points selected by a plurality of times of the second random determination may have a first region including 50% of observation points and a second region existing outside the first region and including remaining 50% of the observation points, the second region being larger than the first region by at least 15%.

In embodiments of the present invention, the meanings of the phrase "the second region being larger than the first region" are as follows. In a case where the second space is one-dimensional, the phrase means that "the total length of the second regions existing on one side and the other side of the first region is longer than the length of the first region". In a case where the second space is two-dimensional, the phrase means that "the area of the second region is larger than the area of the first region". In a case where the second space is three-dimensional, the phrase means that "the volume of the second region is larger than the volume of the first region".

In this manner, the observation points exist according to the probability distribution in which the appearance probability is higher at a location closer to the center location. Thus, the first region which is a center area is recognized with a higher accuracy. Meanwhile, as for the second region which is a periphery area, although recognition of the second region is slightly rough, a wide range of information can be obtained in a short time. In order to cause such advantageous effects to be more effectively exhibited, the second region is preferably larger than the first region by at least 20%, more preferably larger than the first region by at least 30%, further preferably larger than the first region by at least 50%, and even further preferably larger than the first region by at least 80%.

In a case where the step W and the step X of embodiment 1 are applied to an optical microscope, it is possible to execute efficient and swift scanning if light with which a sample being observed is irradiated is controlled by deflecting the light with use of a galvanometer mirror.

Figure 4:
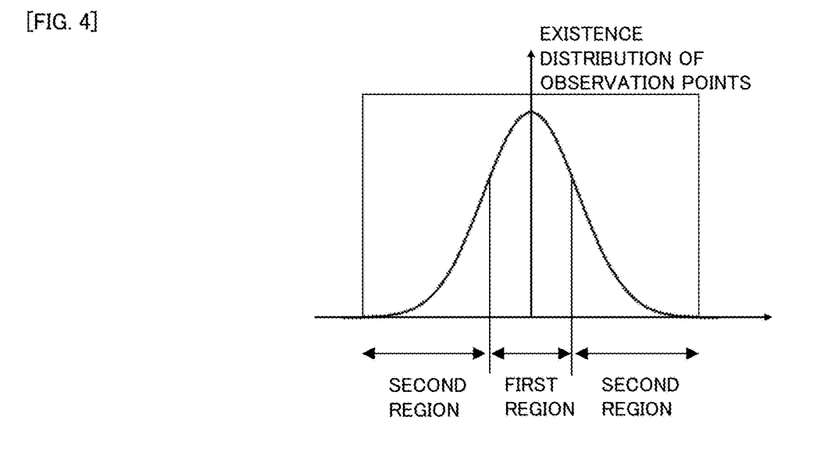
FIG. 4 shows a distribution example of observation points according to embodiment 1 of the present invention.
Figure 5:
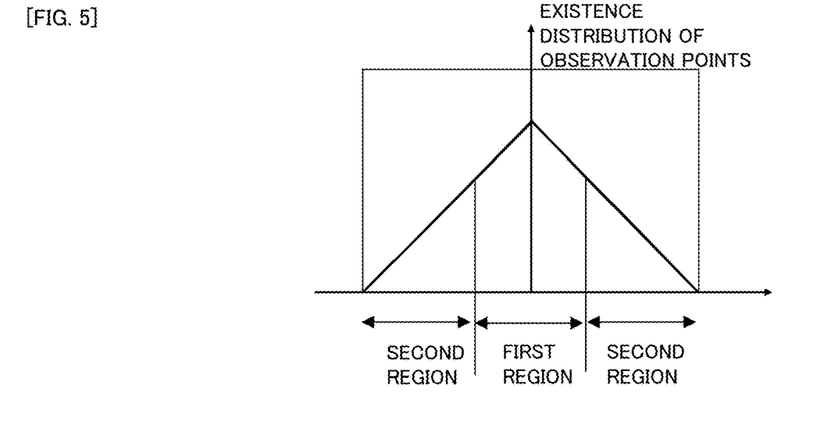
FIG. 5 shows a distribution example of observation points according to embodiment 1 of the present invention.
Figure 6:
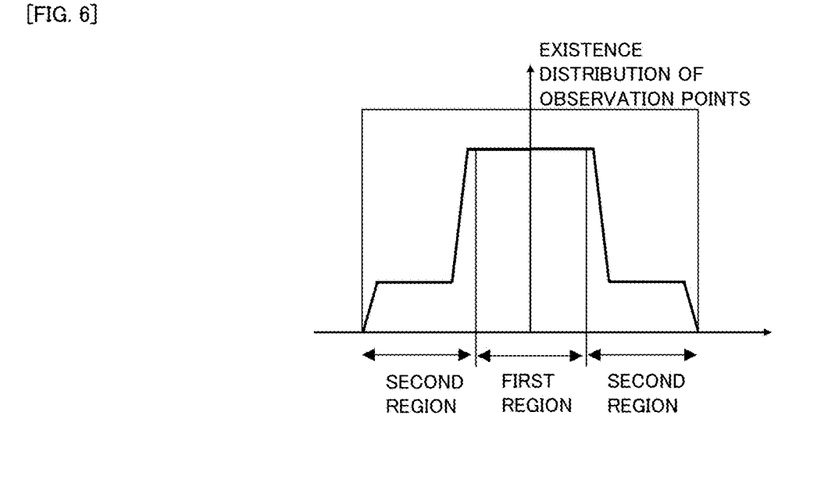
FIG. 6 shows a distribution example of observation points according to embodiment 1 of the present invention.

Each of FIG. 4 to FIG. 6 one-dimensionally shows a distribution example of observation points that are set in a second space. FIG. 4 shows an example in which the observation points exist according to a normal distribution. FIG. 5 shows an example in which the observation points exist according to a triangular distribution. FIG. 6 shows an example in which the observation points are distributed stepwise.

The center of the second scan does not necessarily need to be adjusted to the center of each second space. Preferably, the inside of each second space is scanned before execution of the second scan (hereinafter, written as "pre-second scan") so that a specific location at which there is meaningful data that, for example, has strong contrast is ascertained in the second space, and then the second scan is executed with the specific location being the center of the scan. Accordingly, the specific location at which there is the meaningful data can be resolved in a more focused manner. It is preferable to use, as a scanning method for the pre-second scan, a uniform scanning method such as raster scan or uniform random scan.

(2-2) Step Y

A step Y is a step of obtaining a piece of image data at a location corresponding to an observation point specified through the above-described step X. Basically, the same number of pieces of image data as the number of the observation points are obtained. However, the number of pieces of image data to be obtained may be less than the number of the observation points. For obtaining information, a publicly known array sensor may be used, or a single sensor such as a photodiode may be used.

(3) Continue/End Second Scanning Step

When the obtainment of the piece of image data at the location corresponding to the specific observation point in the second space is completed, the processing is, as shown in FIG. 1, returned to the step X where a process of determining a next observation point is executed in the same second space. The second scan is thus repetitively continued. If the number of observation points reaches a predetermined value, it is possible to: determine that pieces of image data in the second space have been sufficiently obtained; and end the second scanning step.

Meanwhile, it is also possible to, instead of ending the second scanning step if the number of observation points reaches the predetermined value as described above in item (3), end the second scanning step even if the number of observation points does not reach the predetermined value after the second scan has been repetitively continued "n" times. For example, if, in the second scanning step, a step of determining a location of an n-th ("n" is a natural number) observation point is defined as a step Xn and a step of obtaining an n-th piece of image data corresponding to the observation point is defined as a step Yn, the second scanning step can be as follows. That is, the number of observation points to be obtained in the second scanning step is not fixed at a time point of execution of a step X1, and the second scanning step is ended early also when one piece or a plurality of pieces of image data obtained through a step Y1 to the step Yn satisfy a predetermined condition.

(i) Early Ending 1

For example, if meaningful information such as sufficient contrast has already been obtained with the pieces of image data obtained through the step Y1 to the step Yn, it is possible to: determine that an overall image of the second space has been obtained; and end the second scanning step early to proceed to a scan of another second space. Meanwhile, if no meaningful information has yet been obtained with only the pieces of image data obtained through the step Y1 to the step Yn, it is also possible to continue the second scanning step for resolving the second space more in detail.

(ii) Early Ending 2

Contrary to the above-described item (i), if information about a sufficient intensity has not yet been obtained with the pieces of image data obtained through the above-described step Y1 to step Yn, it is possible to: determine that meaningful information is not sufficiently included in this area; and end the second scanning step early to cause the processing to proceed to the step W where a scan of another second space is started. Meanwhile, if information about meaningful image such as contrast has been obtained with the pieces of image data obtained through the step Y1 to the step Yn, it is also possible to continue the second scanning step for further increasing the resolution of the image.

Figure 7:
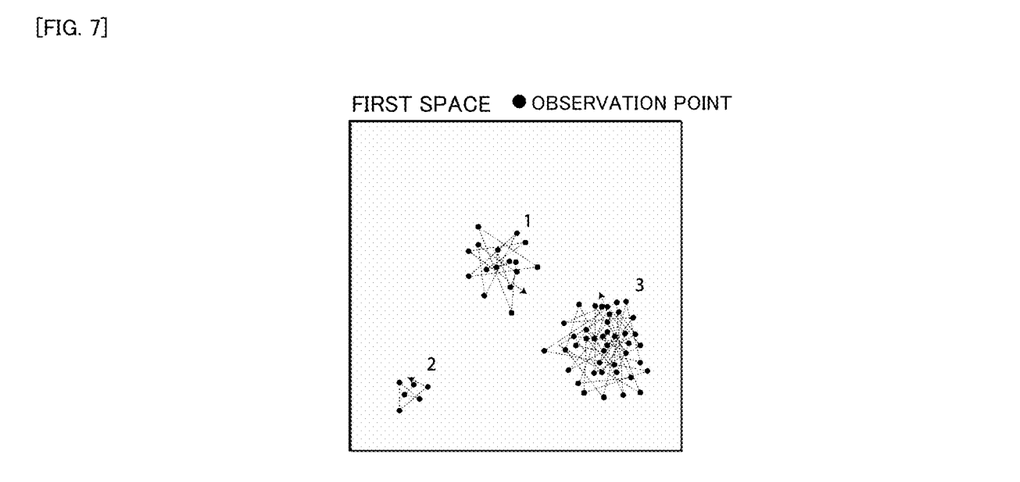
FIG. 7 shows a distribution example of observation points according to embodiment 1 or 2 of the present invention.

FIG. 7 shows a distribution example of observation points scanned by the early ending method according to embodiment 1 or an early ending method according to embodiment 2 described next. As shown in FIG. 7, a plurality of observation points are scanned in each of three second spaces, and the number of observation points varies among the second spaces. In this manner, the timing at which the predetermined condition is satisfied varies among the second spaces. Therefore, a second space in which only a small number of observation points have been scanned and second spaces in which relatively large numbers of observation points have been scanned, are mixed. The second space in which only a small number of observation points have been scanned is a portion that particularly contributes to early obtainment of image data.

Conditions of ending the second scanning step include more specific methods. However, description of these methods is partially the same as description of an image data obtaining method according to embodiment 2 of the present invention described next, and thus the description of early ending is ended for now.

The number of observation points in a second space that satisfies a condition of early ending is smaller than the number of observation points included in another second space. Accordingly, there may be a second space that does not satisfy one of the requirements in the first aspect of the present invention. The one of the requirements is the condition that "the second space has a first region including 50% of observation points and a second region existing outside the first region and including remaining 50% of the observation points, the second region being larger than the first region by at least 15%". However, even if such a second space exists in an embodiment, the embodiment is considered to conform to the first aspect of the present invention as long as another second space that satisfies the said condition exists in the first space.

(4) Continue/End First Scanning Step

If obtainment of pieces of image data of a predetermined second space is not completed, the processing is, as shown in FIG. 1, returned to the step W where a process of determining a location of a next second space is executed in the first space. The first scan is repetitively continued in this manner, whereby pieces of image data of a plurality of second spaces can be obtained. If the number of second spaces reaches a predetermined value, it is possible to: determine that pieces of image data in the first space have been sufficiently obtained; end the first scanning step; and complete the entire processing of obtaining image data.

Embodiment 2

An image data obtaining method according to embodiment 2 of the present invention is a method for obtaining image data of a subject. The method includes: a first scanning step including a plurality of steps W, each step W being a step of determining one place existing in a one-dimensional, two-dimensional, or three-dimensional first space; and a second scanning step of scanning insides of second spaces including at least one of the places. The second scanning step includes a step X of randomly determining a location of an observation point in each second space and a step Y of obtaining a piece of image data for the observation point. If, in the second scanning step, a step of determining a location of an n-th ("n" is a natural number) observation point is defined as a step Xn and a step of obtaining an n-th piece of image data corresponding to the observation point is defined as a step Yn, a number of observation points to be obtained in the second scanning step is not fixed at a time point of execution of a step X1, and the second scanning step is ended when one piece or a plurality of pieces of image data obtained through a step Y1 to the step Yn satisfy a predetermined condition.

The image data obtaining method according to embodiment 2 is executed according to the flowchart in FIG. 1 as in embodiment 1. The only differences between embodiment 1 and embodiment 2 are two points which are: specifics of "(2-1) Step X of randomly determining location of one observation point in second space" in FIG. 1; and specifics of "(3) Continue/end scan of second space" in FIG. 1. Thus, hereinafter, description will be given, focusing on the two differences.

First, description will be given regarding the step of the above-described item (2-1). Embodiment 1 has, in addition to the requirement of randomly determining an observation point, the requirement that "at a time point of end of scanning an inside of one of the second spaces, the second space has a first region including 50% of observation points and a second region existing outside the first region and including remaining 50% of the observation points, the second region being larger than the first region by at least 15%". Meanwhile, embodiment 2 has no particular requirement other than the requirement of randomly determining an observation point.

Next, description will be given regarding the step "(3) Continue/end scan of second space" in FIG. 1. Although embodiment 1 has no particular requirement, embodiment 2 is different from embodiment 1 in that embodiment 2 has the requirement that "if, in the second scanning step, a step of determining a location of an n-th ("n" is a natural number) observation point is defined as a step Xn and a step of obtaining an n-th piece of image data corresponding to the observation point is defined as a step Yn, a number of observation points to be obtained in the second scanning step is not fixed at a time point of execution of a step X1, and the second scanning step is ended when one piece or a plurality of pieces of image data obtained through a step Y1 to the step Yn satisfy a predetermined condition". However, this requirement has already been sufficiently described in item (3) of embodiment 1. Thus, repetitive description thereof will be omitted.

(Common Features)

Hereinafter, description will be given regarding optional features that are common to embodiment 1 and embodiment 2. Description has been given regarding ending the scan in each second space on the basis of a predetermined condition in a part of the mode of embodiment 1 and embodiment 2. The predetermined condition includes a condition that an intensity function having one piece or a plurality of pieces of image data as arguments takes a value not larger than a predetermined value. The intensity function may simply be the total sum of intensities in the one piece or the plurality of pieces of image data or may be the total sum thereof with weighting. Besides, as the intensity function, an intensity function indicating an entropy of the intensities, or an intensity function indicating a standard deviation of the intensities, may be used.

In a part of the mode of embodiment 1 and embodiment 2, the intensity function at the time point of completion of obtaining an n-th piece of data through a step Yn may have, as arguments, m pieces of image data from an (n−m)-th piece to an n-th piece. The reason for this is as follows. That is, by intentionally excluding image data from a first piece to an (n−m−1)-th piece obtained through the step Yn and by using the m pieces of image data from the (n−m)-th piece to the n-th piece as arguments, whether or not to end the second scan can be determined on the basis of the m pieces of image data which have most recently obtained during the second scan.

In embodiment 1 and embodiment 2, it is also a preferable mode not to execute scanning, i.e., the step X, on a region that is at and within a predetermined distance from an observation point having already been scanned in each second space. Since the step X is not executed, the step Y is not executed either. The reason for this is as follows. That is, a piece of image data at the region that is at and within the predetermined distance from the already-scanned point has a relatively high probability of being similar to an already-obtained piece of image data, and thus preferential scanning of a region apart from the observation point by more than the predetermined distance is preferable from the viewpoint of early completion of image data.

In embodiment 1 and embodiment 2, it is preferable that: observation points having already been scanned in a second space are excluded not to be subjected to the step X; and instead, unobserved points (unobserved pixels) proximate to the already-observed points (already-observed pixels) are set to be subjected to the step X. If an unobserved point that is farthest from the center location of the second space among the proximate unobserved points is subjected to the step X and the step Y, it is also possible to perform observation over a range having a larger width than a predetermined probability distribution (for example, Gaussian distribution) according to which the second scan is executed, in association with progression of the second scan.

In embodiment 1 and embodiment 2, from the viewpoint of covering the entire image of the first space early with a smaller number of second spaces, it is preferable that the plurality of second spaces of which the locations are determined through the first scanning step have been selected so as to be discrete from one another. For example, it is preferable to select a next second space such that a circle (or sphere) inscribed on an outer peripheral line (or an outer peripheral surface) of the first space and circumscribed on the second space in which the second scan has already been completed, has a maximum diameter. In addition, it is preferable to select a next second space such that the second spaces in which the second scan has already been completed are not in contact with each other.

In embodiment 1 and embodiment 2, it is preferable that the first scanning step is a step of randomly determining a location of a second space in the first space (first random determination). For example, in a case of observation based on a weak signal requiring 48 hours to recognize the entire image of a first space, if the first scanning step is executed by raster scan, the entire image of the first space cannot be recognized until 48 hours pass. Meanwhile, by the first random determination, the entire image can be roughly recognized in the first 24 hours, for example. Thus, it is possible to obtain choices as to the remaining 24 hours judging from the obtained image data. The choices are whether to cancel the observation or continue the observation to further increase the resolution. In addition, it can be preferable that the first random determination is executed according to, for example, a uniform random number.

In embodiment 1 and embodiment 2, it can be preferable that the second scanning step is executed between one of the steps W and another one of the steps W. However, the plurality of steps W may be concurrently executed to complete specifying locations of all the second spaces before starting the first time of the second scan.

In embodiment 1 and embodiment 2, it is preferable that the second spaces are arranged along a predetermined grid in the first space. The reason for this is that occurrence of inefficiency due to an overlap of second spaces can be prevented owing to the existence of the grid.

In embodiment 1 and embodiment 2, it is preferable that if, in the first scanning step, a step of determining a location of a second space for a k-th ("k" is a natural number) time is defined as a step Wk, remaining second spaces that are located within the predetermined grid and that are other than k second spaces having already been determined through execution of the steps W1 to Wk are equal to one another in terms of a probability of being determined as a (k+1)-th second space. This is a means for disposing the plurality of second spaces such that the second spaces are discrete from one another, as already described.

A program to execute the image data obtaining methods described above is useful for executing the methods on a computer. The program may be stored in an image data measurement device or may be stored so as to be available via the internet.

A confocal microscope and a Raman microscope that allow implementation of the image data obtaining methods described above are very useful as high-speed and high-resolution image obtaining devices.

EXAMPLES

An optical microscope was actually used to conduct: tests of generating pieces of image data by the method according to the above-described embodiment 1 (Example 1) and the method according to the above-described embodiment 2 (Example 2) in the course of forming images of samples; and tests of generating pieces of image data by a method that adopts conventional raster scan without executing the two-stage scan (Comparative Example 1 and Comparative Example 2) in the course of forming images of samples. Hereinafter, the obtained images will be described. Specific conditions of forming the images are as follows.

Microscope Used: RAMAN Drive Manufactured by Nanophoton Corporation
Samples used in tests: polystyrene particles
Magnification of microscope: 100-fold
Total number of observation points: 8000 pixels Example 1 and Comparative Example 1

Figure 8:
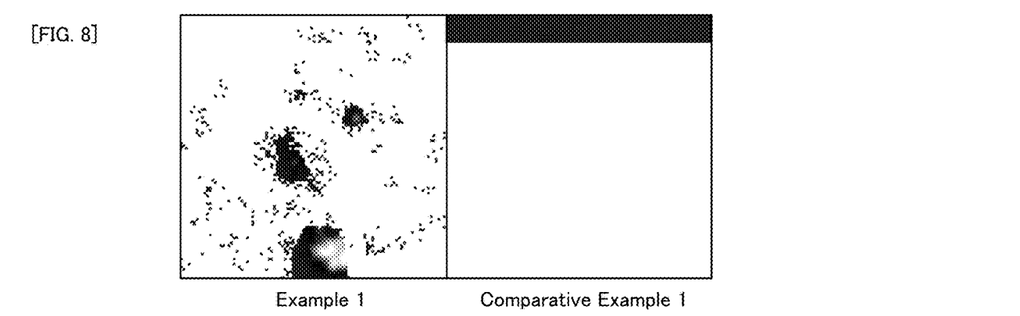
FIG. 8 shows a stage of forming pieces of image data in Example 1 and Comparative Example 1.
Figure 9:
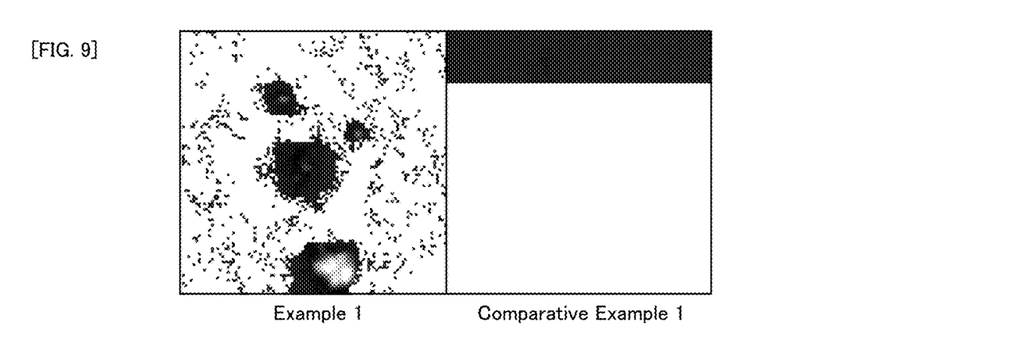
FIG. 9 shows a stage of forming pieces of image data in Example 1 and Comparative Example 1.
Figure 10:
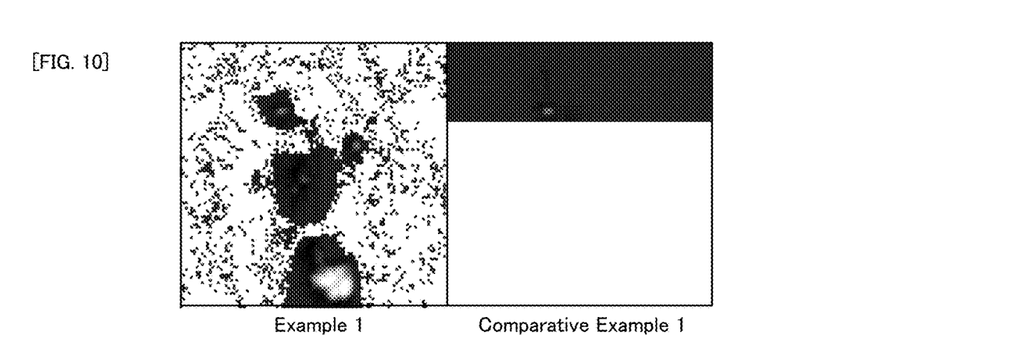
FIG. 10 shows a stage of forming pieces of image data in Example 1 and Comparative Example 1.
Figure 11:
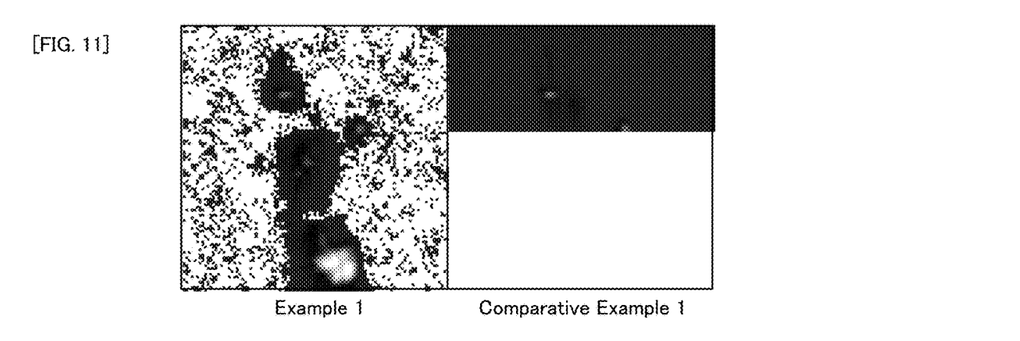
FIG. 11 shows a stage of forming pieces of image data in Example 1 and Comparative Example 1.
Figure 12:
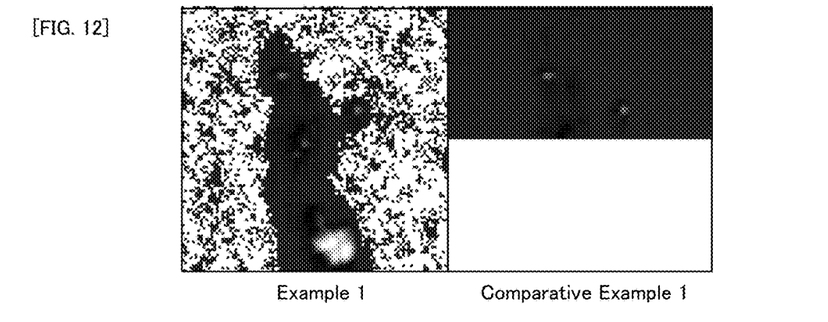
FIG. 12 shows a stage of forming pieces of image data in Example 1 and Comparative Example 1.
Figure 13:
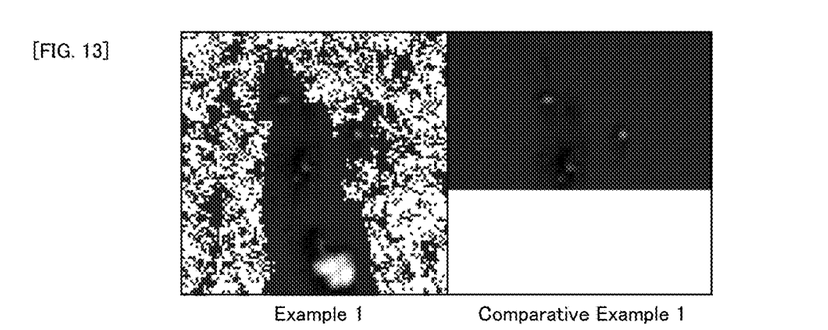
FIG. 13 shows a stage of forming pieces of image data in Example 1 and Comparative Example 1.
Figure 14:
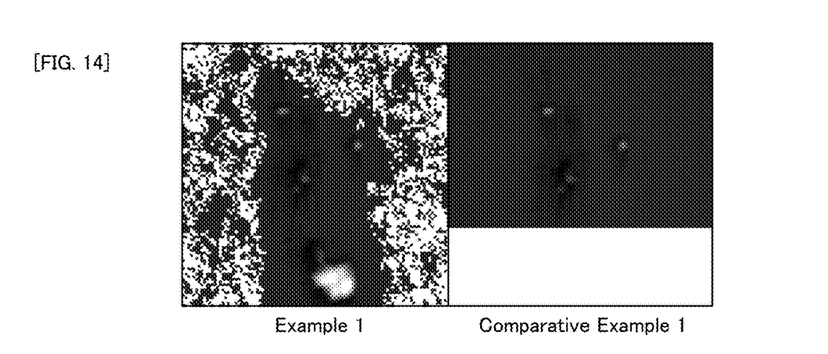
FIG. 14 shows a stage of forming pieces of image data in Example 1 and Comparative Example 1.
Figure 15:
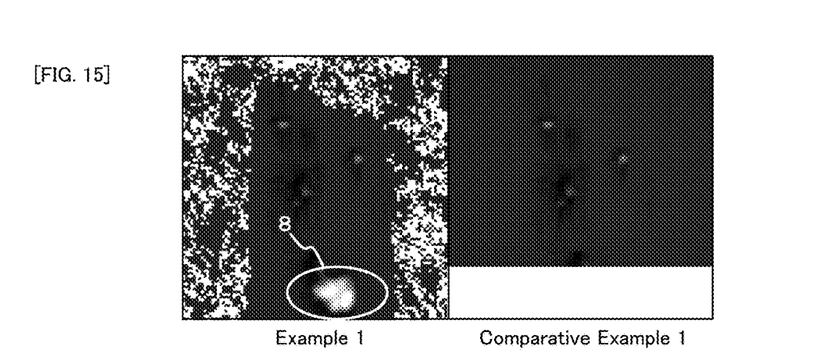
FIG. 15 shows a stage of forming pieces of image data in Example 1 and Comparative Example 1.

FIG. 8 to FIG. 15 each show pieces of image data obtained by the methods according to Example 1 and Comparative Example 1. In each of the drawings, a piece of image data of Example 1 is displayed at the left half and a piece of image data of Comparative Example 1 is displayed at the right half such that the pieces are adjacent to each other. FIG. 8 to FIG. 15 indicate progresses made during generation of image data. FIG. 8 shows pieces of image data at the time point of completing the scan of 1000 pixels. FIG. 9 shows pieces of image data at the time point of completing the scan of 2000 pixels. FIG. 10 shows pieces of image data at the time point of completing the scan of 3000 pixels. FIG. 11 shows pieces of image data at the time point of completing the scan of 4000 pixels. FIG. 12 shows pieces of image data at the time point of completing the scan of 5000 pixels. FIG. 13 shows pieces of image data at the time point of completing the scan of 6000 pixels. FIG. 14 shows pieces of image data at the time point of completing the scan of 7000 pixels. FIG. 15 shows pieces of image data at the time point of completing the scan of 8000 pixels.

As seen from FIG. 15, in the piece of image data obtained through Comparative Example 1 and displayed at the right half of the screen, only about 80% of the entire screen has been scanned, and no image information has been obtained at all in a region at a lower part that occupies about 20% of the screen. Meanwhile, the piece of image data obtained through Example 1 and displayed at the left half of the screen has been nearly completed over the entire visual field plane and has a characteristic image 8 appearing on the piece of image data. The image 8 cannot be seen at all in the image according to Comparative Example 1.

Example 2 and Comparative Example 2

Figure 16:
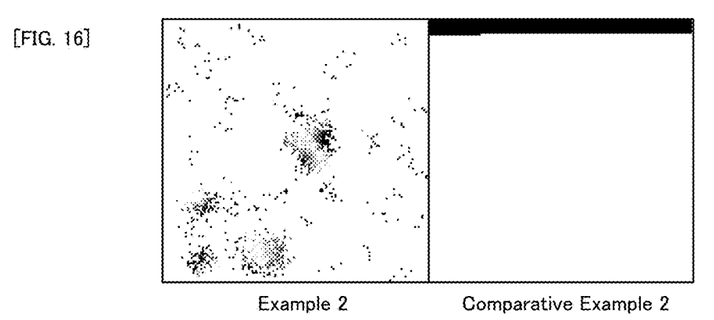
FIG. 16 shows a stage of forming pieces of image data in Example 2 and Comparative Example 2.
Figure 17:
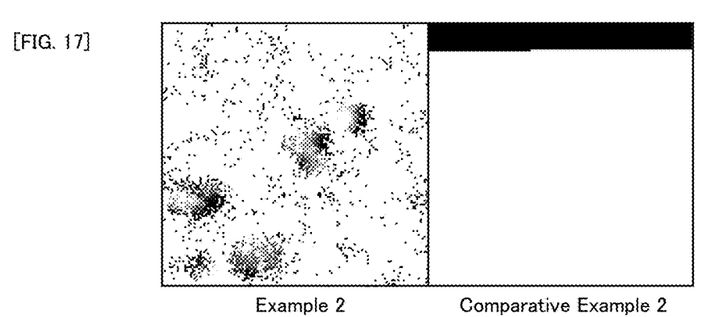
FIG. 17 shows a stage of forming pieces of image data in Example 2 and Comparative Example 2.
Figure 18:
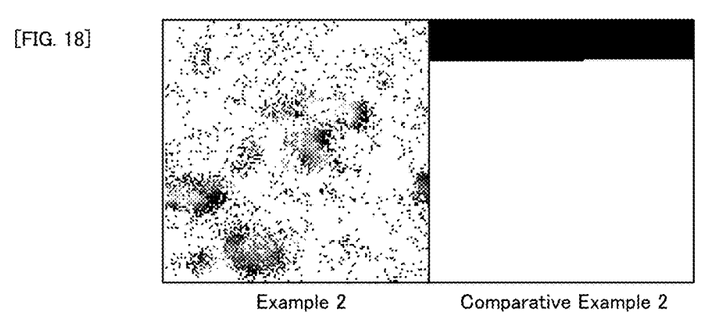
FIG. 18 shows a stage of forming pieces of image data in Example 2 and Comparative Example 2.
Figure 19:
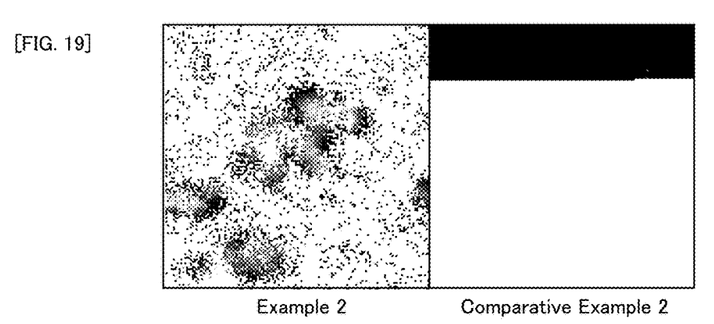
FIG. 19 shows a stage of forming pieces of image data in Example 2 and Comparative Example 2.
Figure 20:
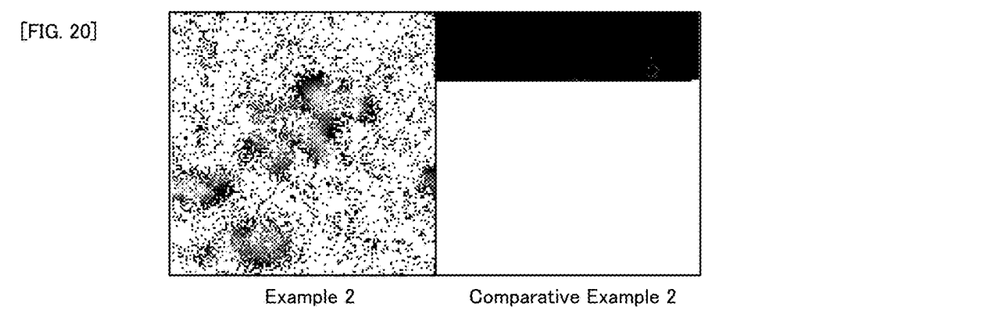
FIG. 20 shows a stage of forming pieces of image data in Example 2 and Comparative Example 2.
Figure 21:
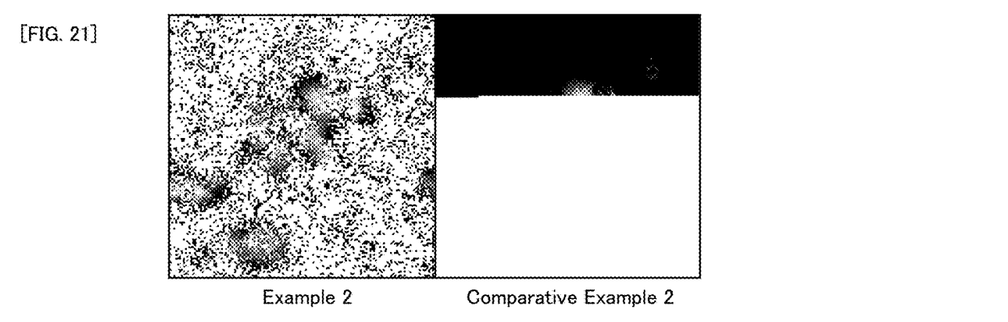
FIG. 21 shows a stage of forming pieces of image data in Example 2 and Comparative Example 2.
Figure 22:
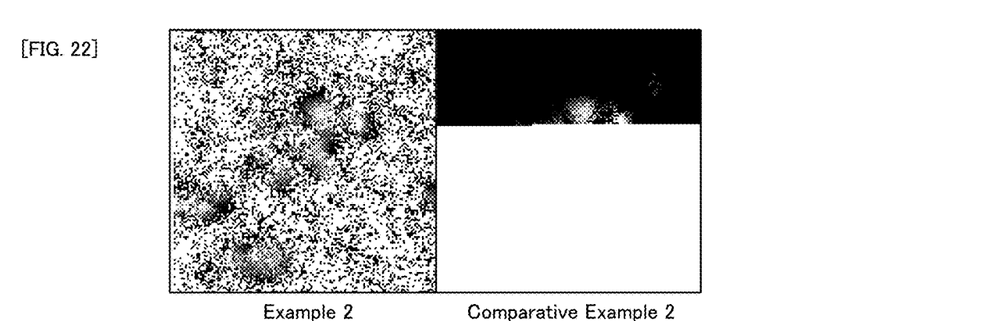
FIG. 22 shows a stage of forming pieces of image data in Example 2 and Comparative Example 2.
Figure 23:
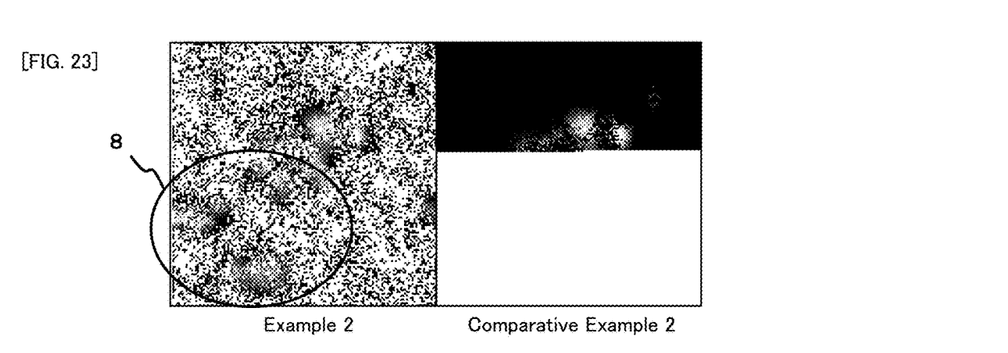
FIG. 23 shows a stage of forming pieces of image data in Example 2 and Comparative Example 2.

FIG. 16 to FIG. 23 each show pieces of image data obtained by the methods according to Example 2 and Comparative Example 2. In each of the drawings, a piece of image data of Example 2 is displayed at the left half and a piece of image data of Comparative Example 2 is displayed at the right half such that the pieces are adjacent to each other. FIG. 16 to FIG. 23 indicate progresses made during generation of image data. FIG. 16 shows pieces of image data at the time point of completing the scan of 1000 pixels. FIG. 17 shows pieces of image data at the time point of completing the scan of 2000 pixels. FIG. 18 shows pieces of image data at the time point of completing the scan of 3000 pixels. FIG. 19 shows pieces of image data at the time point of completing the scan of 4000 pixels. FIG. 20 shows pieces of image data at the time point of completing the scan of 5000 pixels. FIG. 21 shows pieces of image data at the time point of completing the scan of 6000 pixels. FIG. 22 shows pieces of image data at the time point of completing the scan of 7000 pixels. FIG. 23 shows pieces of image data at the time point of completing the scan of 8000 pixels.

As seen from FIG. 23, in the piece of image data obtained through Comparative Example 2 and displayed at the right half of the screen, only about 40% of the entire screen has been scanned, and no image information has been obtained at all in a region at a lower part that occupies about 60% of the screen. Meanwhile, the piece of image data obtained through Example 2 and displayed at the left half of the screen has been nearly completed over the entire visual field plane and has a characteristic image 8 appearing on the piece of image data. The image 8 cannot be seen at all in the image according to Comparative Example 2.

This application claims priority to Japanese Patent Application No. 2019-064034 filed on Mar. 28, 2019, and priority to Japanese Patent Application No. 2019-204761 filed on Nov. 12, 2019. The entire contents of the specification of Japanese Patent Application No. 2019-064034 and the entire contents of the specification of Japanese Patent Application No. 2019-204761 are incorporated herein by reference.

INDUSTRIAL APPLICABILITY

Large screens will need to be more efficiently scanned in a shorter time in future in the fields of, for example, lidars, astronomical observation, electron beam lithography, focused ion-beam processing, processing with three-dimensional printers (including processing by two-photon polymerization), display systems such as laser displays and laser televisions, and the like as well as laser scanning microscopes and scanning electron microscopes. These are suitable as fields to which the present invention is applicable. Furthermore, cutting-edge measurement devices that analyze images based on weak signals such as Raman scattering microscopes may be replaced by devices that implement the present invention.

DESCRIPTION OF THE REFERENCE CHARACTERS

1 to 7 Locus of first scan (place of second space in first space)
8 Image not observed in Comparative Example

The invention claimed is:

1. A method for obtaining image data of a subject, the image data obtaining method comprising:
    a first scanning step including a plurality of steps W, each step W being a step of determining one place existing in a one-dimensional, two-dimensional, or three-dimensional first space; and
    a second scanning step of scanning insides of second spaces including at least one of the places, wherein
    the second scanning step includes a step X of randomly determining a location of an observation point (hereinafter, written as "second random determination") and a step Y of obtaining a piece of image data for the observation point, and,
    at a time point of end of scanning an inside of one of the second spaces, the second space has a first region including 50% of observation points and a second region existing outside the first region and including remaining 50% of the observation points, the second region being larger than the first region by at least 15%.

2. The image data obtaining method according to claim 1, further comprising a pre-second scanning step of scanning the insides of the second spaces before start of the second scanning step, adjusting a center of scanning in the second scanning step to a specific location that has been determined through the pre-second scanning step.

3. The image data obtaining method according to claim 1, wherein if, in the second scanning step, a step of determining a location of an n-th ("n" is a natural number) observation point is defined as a step Xn and a step of obtaining an n-th piece of image data corresponding to the observation point is defined as a step Yn, a number of observation points to be obtained in the second scanning step is not fixed at a time point of execution of a step X1, and the second scanning step is ended when one piece or a plurality of pieces of image data obtained through a step Y1 to the step Yn satisfy a predetermined condition.

4. A method for obtaining image data of a subject, the image data obtaining method comprising:
    a first scanning step including a plurality of steps W, each step W being a step of determining one place existing in a one-dimensional, two-dimensional, or three-dimensional first space; and
    a second scanning step of scanning insides of second spaces including at least one of the places, wherein
    the second scanning step includes a step X of randomly determining a location of an observation point in each second space (hereinafter, written as "second random determination") and a step Y of obtaining a piece of image data for the observation point, and,
    if, in the second scanning step, a step of determining a location of an n-th ("n" is a natural number) observation point is defined as a step Xn and a step of obtaining an n-th piece of image data corresponding to the observation point is defined as a step Yn, a number of observation points to be obtained in the second scanning step is not fixed at a time point of execution of a step X1, and the second scanning step is ended when one piece or a plurality of pieces of image data obtained through a step Y1 to the step Yn satisfy a predetermined condition.

5. The image data obtaining method according to claim 3, wherein the predetermined condition is that an intensity function having the one piece or the plurality of pieces of image data as arguments takes a value not larger than a predetermined value.

6. The image data obtaining method according to claim 5, wherein the intensity function at a time point of completion of obtaining an n-th piece of data through the step Yn has, as arguments, m pieces of image data which have most recently obtained during the second scan, where "m" and "n" are natural numbers (m<n).

7. The image data obtaining method according to claim 1, wherein no scan is executed on a region that is at and within a predetermined distance from an observation point having already been scanned in each second space.

8. The image data obtaining method according to claim 1, wherein the first scanning step is a step of randomly determining the places of the second spaces in the first space (hereinafter, written as "first random determination").

9. The image data obtaining method according to claim 8, wherein the first random determination is executed according to a uniform random number.

10. The image data obtaining method according to claim 1, wherein the second random determination is executed according to a normal random number.

11. A non-transitory computer readable medium storing a program configured to execute the image data obtaining method according to claim 1.

12. A confocal microscope configured to execute the image data obtaining method according to claim 1.

13. A Raman microscope configured to execute the image data obtaining method according to claim 1.

14. The image data obtaining method according to claim 4, wherein no scan is executed on a region that is at and within a predetermined distance from an observation point having already been scanned in each second space.

15. The image data obtaining method according to claim 4, wherein the first scanning step is a step of randomly determining the places of the second spaces in the first space.

16. The image data obtaining method according to claim 15, wherein the first random determination is executed according to a uniform random number.

17. The image data obtaining method according to claim 4, wherein the second random determination is executed according to a normal random number.

18. A non-transitory computer readable medium storing a program configured to execute the image data obtaining method according to claim 4.

19. A confocal microscope configured to execute the image data obtaining method according to claim 4.

20. A Raman microscope configured to execute the image data obtaining method according to claim 4.

* * * * *